US012810083B2

(12) United States Patent
Yu et al.

(10) Patent No.: US 12,810,083 B2
(45) Date of Patent: Nov. 24, 2026

(54) SYSTEM, METHOD AND SMART TERMINAL FOR MULTI-USER CROSS-LANGUAGE INTERACTION BASED ON LARGE LANGUAGE MODELS

(71) Applicant: SOLOS TECHNOLOGY (SHENZHEN) LIMITED, Shenzhen (CN)

(72) Inventors: Chi Sum Yu, Shenzhen (CN); Chun Tung Chow, Shenzhen (CN); Kai Yin Chan, Shenzhen (CN); Wai Kuen Cheung, Shenzhen (CN); Kenneth Fan, Shenzhen (CN)

(73) Assignee: Solos Technology Limited, Shatin (HK)

( * ) Notice: Subject to any disclaimer, the term of this patent is extended or adjusted under 35 U.S.C. 154(b) by 146 days.

(21) Appl. No.: 18/789,474

(22) Filed: Jul. 30, 2024

(65) Prior Publication Data

US 2025/0225343 A1 Jul. 10, 2025

(30) Foreign Application Priority Data

Jan. 6, 2024 (CN) ......................... 202410024352.4

(51) Int. Cl.

| | |
|---|---|
| ***G06F 40/58*** | (2020.01) |
| ***G06F 1/16*** | (2006.01) |
| ***G10L 15/26*** | (2006.01) |

(52) U.S. Cl.

CPC .............. *G06F 40/58* (2020.01); *G06F 1/163* (2013.01)

(58) Field of Classification Search

CPC ............... G06F 16/955; G06F 16/3329; G06F 16/9574; G06F 16/00; G06F 16/90332;

(Continued)

(56) References Cited

U.S. PATENT DOCUMENTS 6,901,367 B1 * 5/2005 Berstis .................... G10L 15/26
704/277
2001/0029455 A1 * 10/2001 Chin ....................... G06F 40/58
704/277

(Continued)

FOREIGN PATENT DOCUMENTS

CN 115658843 A 1/2023
CN 117236347 A * 12/2023

(Continued)

*Primary Examiner* — Leshui Zhang
(74) *Attorney, Agent, or Firm* — Caldwell LLC

(57) ABSTRACT

A system, method and smart terminal for multi-user cross-language interaction based on large language models (LLMs) are provided. The system includes a master smart terminal and a plurality of slave smart terminals. The master smart terminal obtains first to be translated data from a first user, translates the first to be translated data into at least one first data through a first LLM according to a first translation prompt, and distributes the at least one first data to at least one corresponding slave smart terminal for output The slave smart terminal obtains second to be translated data from a second user, translates the second to be translated data into second data through a second LLM according to a second translation prompt, and transmits the second data to the master smart terminal for output. The present application realizes the multi-user cross-language interaction based on LLMs with collaboration of multiple smart terminals.

17 Claims, 6 Drawing Sheets

(58) Field of Classification Search

CPC .......... G06F 40/58; G06F 40/35; G06F 40/30; G06F 40/40; G06F 40/20; G06F 1/163; G06F 8/30; G06F 21/53; G06F 21/6245; G10L 15/26; G10L 15/22; G06N 3/08; G06N 20/00

USPC ...................... 704/1–9, 270, 277, 272, 270.1

See application file for complete search history.

(56) References Cited

U.S. PATENT DOCUMENTS

| | | | | |
|---|---|---|---|---|
| 2005/0131709 | A1* | 6/2005 | Creamer | G10L 19/018<br>704/277 |
| 2008/0059200 | A1* | 3/2008 | Puli | G06F 40/58<br>704/277 |
| 2010/0185434 | A1* | 7/2010 | Burvall | G10L 15/005<br>704/3 |
| 2011/0134910 | A1* | 6/2011 | Chao-Suren | H04L 65/765<br>704/277 |
| 2012/0078609 | A1* | 3/2012 | Chaturvedi | G06F 40/58<br>704/3 |
| 2019/0251156 | A1* | 8/2019 | Waibel | G06F 40/174 |
| 2023/0040219 | A1* | 2/2023 | Alex | G06F 3/167 |
| 2024/0370669 | A1* | 11/2024 | Akiyama | G06F 40/40 |

FOREIGN PATENT DOCUMENTS

| | | | | |
|---|---|---|---|---|
| CN | 117273026 | A | 12/2023 | |
| WO | WO-2022113189 | A1 * | 6/2022 | G06F 40/40 |

* cited by examiner

SYSTEM, METHOD AND SMART TERMINAL FOR MULTI-USER CROSS-LANGUAGE INTERACTION BASED ON LARGE LANGUAGE MODELS

CROSS REFERENCE TO RELATED APPLICATIONS

This application claims priority to Chinese Patent Application No. 202410024352.4 filed Jan. 6, 2024, which is hereby incorporated by reference herein as if set forth in its entirety.

BACKGROUND

1. Technical Field

The present disclosure generally relates to the technical field of smart glasses, and particularly to a system, method and smart terminal for multi-user cross-language interaction based on large language models.

2. Description of Related Art

As computer technology has advanced, smart glasses, smartphones, and other smart wearable devices have become increasingly widespread. However, the smart terminals in the prior art are often expensive and largely limited to standalone functions such as playing music, making or receiving calls, browsing the web, and so on. These smart terminals or devices operate independently and lack the ability to collaborate with one another.

SUMMARY

The embodiments of the present disclosure relate to a system, method and smart terminal for multi-user cross-language interaction based on large language models (LLMs). Specifically, the embodiments described herein enable collaborative functionality among multiple smart terminals, leveraging one or more LLMs to overcome language barriers and enhance user interaction. This approach significantly improves the practical utility, interactive capabilities, and overall intelligence of smart terminals. Furthermore, by offering seamless multi-lingual communication, the disclosed technology enhances user engagement and retention, thereby increasing product stickiness. The innovative integration of LLMs with networked smart terminals addresses existing limitations in cross-language communication and inter-device collaboration, marking a substantial advancement in the field of smart wearable communication system.

One embodiment of the present disclosure provides a multi-user cross-language interactive system based on LLMs. The multi-user cross-language interactive system includes: a master smart terminal and a plurality of slave smart terminals.

The master smart terminal is used for: obtaining first to be translated data from a first user, translating the first to be translated data into at least one first data through a first LLM according to a first translation prompt, and distributing the at least one first data to at least one corresponding slave smart terminal for output, wherein a language of the at least one first data corresponds to a language used by the at least one corresponding slave smart terminal, and the first LLM is configured on the master smart terminal or a cloud server.

The slave smart terminal is used for: obtaining second to be translated data from a second user, translating the second to be translated data into second data through a second LLM according to a second translation prompt, and transmitting the second data to the master smart terminal for output, wherein a language of the second data is a language used by the master smart terminal, and the second LLM is configured on the slave smart terminals or the cloud server.

One embodiment of the present disclosure further provides a smart terminal based on large language model (LLM), including: an input device, a processor, a wireless communication component and a memory. The processor is electrically connected to the input device, the wireless communication component and the memory.

One or more computer programs executable on the processor are stored in the memory, and the one or more computer programs comprise instructions for:

- in response to a first configuration instruction, configuring the smart terminal as a host;
- when the smart terminal acts as the host, obtaining, by the input device, first to be translated data, and transmitting, by the wireless communication component, the first to be translated data to a cloud server, so as to, through the cloud server, translate the first to be translated data into at least one first data using a LLM on the cloud server according to a first translation prompt and distribute the at least one first data to at least one slave smart terminal, wherein the first to be translated data comprises a first to be translated text or a first to be translated speech from a user of the smart terminal as the host, and a language of the at least one first data corresponds to a language used by the at least one slave smart terminal;
- in response to a second configuration instruction, configuring the smart terminal as a slave; and
- when the smart terminal acts as the slave, obtaining, by the input device, second to be translated data, and transmitting the second to be translated data to the cloud server, so as to, through the cloud server, translate the second to be translated data into second data using the LLM according to a second translation prompt and transmit the second data to a master smart terminal, wherein the second to be translated data comprises a second to be translated text or a second to be translated speech from the user of the smart terminal as the slave, and a language of the second data corresponds to a language used by the master smart terminal.

One embodiment of the present disclosure further provides a method for multi-user cross-language interaction based on large language model (LLM), applied to a smart mobile terminal, including:

- configuring the smart mobile terminal as a host in response to a first configuration instruction;
- obtaining and transmitting, by the smart mobile terminal as the host, first to be translated data to a cloud server, so as to: through the cloud server, translate the first to be translated data into at least one first data using a LLM on the cloud server according to a first translation prompt, and distribute the at least one first data to at least one slave smart mobile terminal, wherein the first to be translated data comprises a first to be translated text or a first to be translated speech from a user of the smart mobile terminal as the host, and a language of the at least one first data corresponds to a language used by the at least one slave smart mobile terminal;
- configuring the smart mobile terminal as a slave in response to a second configuration instruction; and obtaining and transmitting, by the smart mobile terminal as the slave, second to be translated data to the cloud server, so as to: through the cloud server, the second to be translated data into second data using the LLM according to a second translation prompt, and transmit the second data to the master smart mobile terminal, wherein the second to be translated data comprises a second to be translated text or a second to be translated speech from the user of the smart mobile terminal as the slave, and a language of the second data corresponds to a language used by the master smart mobile terminal.

In each embodiment of the present disclosure, the multi-user cross-language interactive capabilities are realized by combining multiple smart terminals with LLMs. This LLM-based approach enhances the practicality, interactivity, and intelligence of the smart terminal ecosystem, thereby increasing user engagement and satisfaction with the product. By leveraging the advanced natural language processing capabilities of the LLMs, the multi-user cross-language interaction feature allows users to seamlessly communicate across language barriers, fostering more inclusive and collaborative experiences.

BRIEF DESCRIPTION OF THE DRAWINGS

In order to more clearly illustrate the technical solutions in this embodiment, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

In order to make the objects, features and advantages of the present disclosure more obvious and easier to understand, the technical solutions in this embodiment will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

In the following descriptions, the terms "including", "comprising", "having" and their cognates that are used in the embodiments of the present disclosure are only intended to represent specific features, numbers, steps, operations, elements, components, or combinations of the foregoing items, and should not be understood as excluding the possibilities of the existence of one or more other features, numbers, steps, operations, elements, components or combinations of the foregoing items or adding one or more features, numbers, steps, operations, elements, components or combinations of the foregoing items.

In addition, in the present disclosure, the terms "first", "second", "third", and the like are only used for distinguishing, and cannot be understood as indicating or implying relative importance.

Unless otherwise defined, all terms (including technical and scientific terms) used herein have the same meanings as commonly understood by those skilled in the art to which the embodiments of the present disclosure belong. The terms (e.g., the terms those defined in commonly used dictionaries) will be interpreted as having the same meaning as the contextual meaning in the relevant technology and will not be interpreted as having idealized or overly formal meanings, unless clearly defined in the embodiments of the present disclosure.

Figure 1:
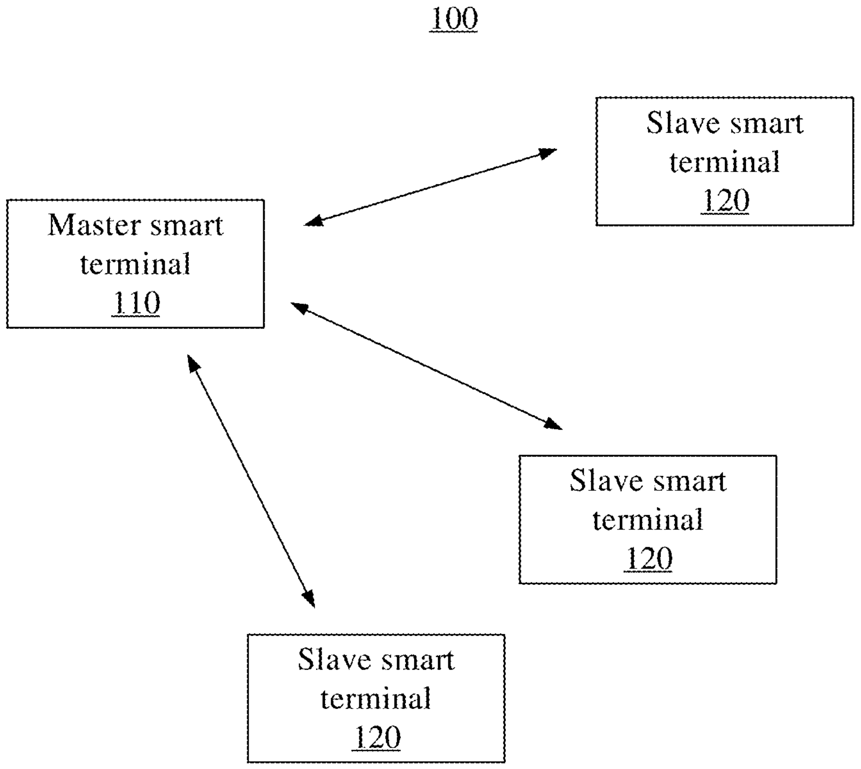
FIG. 1 is a schematic structural diagram of a multi-user cross-language interactive system based on large language models (LLMs) according to one embodiment of the present disclosure.

Referring to FIG. 1, a schematic structural diagram of a multi-user cross-language interactive system based on large language models (LLMs) according to one embodiment of the present disclosure. As shown in FIG. 1, the multi-user cross-language interactive system based on LLMs (hereinafter referred to as system) 100 includes: a master smart terminal 110 and a plurality of slave smart terminals 120. The plurality of slave smart terminals 120 are attached to the master smart terminal 110. The relationship between the master smart terminal 110 and the slave smart terminals 120, may be, but is not limited to, for example, a tour guide and tourists of different nationalities (languages) in a tour guide scenario, a host and other participants of different nationalities (languages) in a conference scenario, and a host and exhibitors of different nationalities (languages) in an exhibition scenario. The language used by each terminal is the language used (or spoken) by users of each terminal.

The master smart terminal 110 is used for: obtaining first to be translated data from a first user, translating the first to be translated data into at least one first data through a first LLM (Large Language Model) according to a first translation prompt, and distributing the at least one first data to at least one corresponding slave smart terminal 120 for output (such as, displaying and/or playback). The language of the at least one first data corresponds to the language used by the at least one corresponding slave smart terminal 120. The first LLM is configured on the master smart terminal 110 or a cloud server. The first user is a user of the master smart terminal 110.

The slave smart terminal 120 is used for: obtaining second to be translated data from a second user, translating the second to be translated data into second data through a second LLM according to a second translation prompt, and transmitting the second data to the master smart terminal 110 for output. The language of the second data is the language used by the master smart terminal 110. The second LLM is configured on the slave smart terminal 120 or the cloud server. The second user is a user of the slave smart terminal 120.

Optionally, in other embodiments of the present disclosure, the master smart terminal 110 is further used for: determining whether all the slave smart terminals 120 use the same language as the first user; in response to all the slave smart terminals 120 using the same language as the first user, distributing the first to be translated data to each of the slave smart terminals 120 for output; and in response to a language used by at least one terminal in the slave smart terminals 120 being different from a language used by the first user, transmitting the first to be translated data to at least one first terminal in the slave smart terminals 120 for output, translating the first to be translated data into the at least one first data through the first LLM according to the first translation prompt, and distributing the at least one first data to at least one second terminal in the slave smart terminals 120 for output. The language of the at least one first data corresponds to the language used by the at least one second terminal, the language used by the at least one first terminal is the same as the language used by the first user, and the language used by the at least one second terminal is different from the language used by the first user.

Specifically, the master smart terminal 110 determines whether the language used by the user of at least one terminal in the slave smart terminals 120 is different from the language used by the user of the master smart terminal 110. If no, that is, all the users of the slave smart terminals 120 use the same language as the user of the master smart terminal 110, the master smart terminal 110 does not translate the first to be translated data, and directly distributes the first to be translated data to each of the slave smart terminals 120 for output. If yes, that is, the language used by the user of the at least one terminal in the slave smart terminals 120 is different from the language used by the user of the master smart terminal 110, on the one hand, the master smart terminal 110 directly transmits the first to be translated data to the at least one first terminal in the slave smart terminals 120 for output, where the user of the at least one first terminal uses the same language as the first user; on the other hand, the master smart terminal 110 translates the first to be translated data into the at least one first data according to the first translation prompt, and distributes the at least one first data to the at least one second terminal in the slave smart terminals 120 for output. The language of the at least one first data corresponds to the language used by the user of the at least one second terminal, and the language used by the user of the at least one second terminal is different from the language used by the first user.

For example, when the user 1 of the master smart terminal 110 uses Chinese, the user 2 of the slave smart terminal 120A uses English, the user 3 of the slave smart terminal 120B uses Japanese, and the user 4 of the slave smart terminal 120C uses Chinese, the master smart terminal 110 directly transmits the first to be translated data from the user 1 to the slave smart terminal 120C, and at the same time, the master smart terminal 110 further translates the first to be translated data into first data in English and first data in Japanese, transmits the first data in English to the slave smart terminal 120A, and transmits the first data in Japanese to the slave smart terminal 120B.

Optionally, in other embodiments of the present disclosure, the slave smart terminal 120 is further used for: determining whether a language used by the second user is the same as a language used by the first user; in response to the language used by the second user being the same as the language used by the first user, transmitting the second to be translated data to the master smart terminal 110 for output; and in response to the language used by the second user not being the same as the language used by the first user, translating the second to be translated data into the second data through the second LLM according to the second translation prompt, and transmitting the second data to the master smart terminal 110 for output.

Optionally, the above-mentioned to be translated data may be a text input by the user or a user speech picked up by microphone(s), and the form of the translated data may be the same as or different from the to be translated data. For example, a text may be translated into a text, or the text further may be translated into a speech with corresponding translated content, a speech may be translated into a speech, or the speech further may be translated into a text with corresponding translated content. The above-mentioned output may be playing the speech through the speaker(s), or displaying the text on the screen(s). The text and the user speech are based on the natural language, and the translation performed by the LLM(s) is also based on the natural language.

Optionally, when the LLM(s) are configured on a cloud server, the actions of the above-mentioned language determining and determining whether to directly transmit the to be translated data according to the determining result further may performed by the cloud server.

Optionally, in other embodiments of the present disclosure, the master smart terminal 120 includes: a master smart wearable device 111 and/or a master smart mobile terminal 112, and the slave smart terminal 120 includes: a slave smart wearable device 121 and/or a slave smart mobile terminal 122. Each of the first LLM and the second LLM includes: a Generative Artificial Intelligence Large Language (GAILLM) and/or a Multimodal Large Language Model (MLLM).

In the embodiment, the smart wearable devices may include, but are not limited to: smart safety helmets, smart headphones, smart earrings, smart watches, smart glasses, and other wearable smart devices. Each smart mobile terminal may include, but is not limited to: cellular phone, smart phone, other wireless communication device, personal digital assistant, audio player, other media player, music recorder, video recorder, camera, other media recorder, smart radio, Laptop computer, personal digital assistant (PDA), portable multimedia player (PMP), Moving Picture Experts Group (MPEG-1 or MPEG-2) audio layer 3 (MP3) player, digital camera, and other smart devices that can process data on the move. The smart mobile terminal is further installed with Android, IOS or other operating systems.

The GAILLM may be, for example but not limited to: at least one of Open AI's ChatGPT, Google's Bard, and other models with similar functions. The MLLM may be, for example but not limited to: at least one of BLIP-2, LLaVA, MiniGPT-4, mPLUG-Owl, LLaMA-Adapter-v2, Otter, Multimodal-GPT, InstructBLIP, VisualGLM-6B, PandaGPT, LaVIN, and other models with similar functions.

The first LLM and the second LLM may be the same model, or two models of the same type located on different servers, or two different LLMs. For example, the first LLM and the second LLM may be both the GAILLM or both the MLLM; or, one of them may be the GAILLM and the other may be the MLLM.

Figure 2:
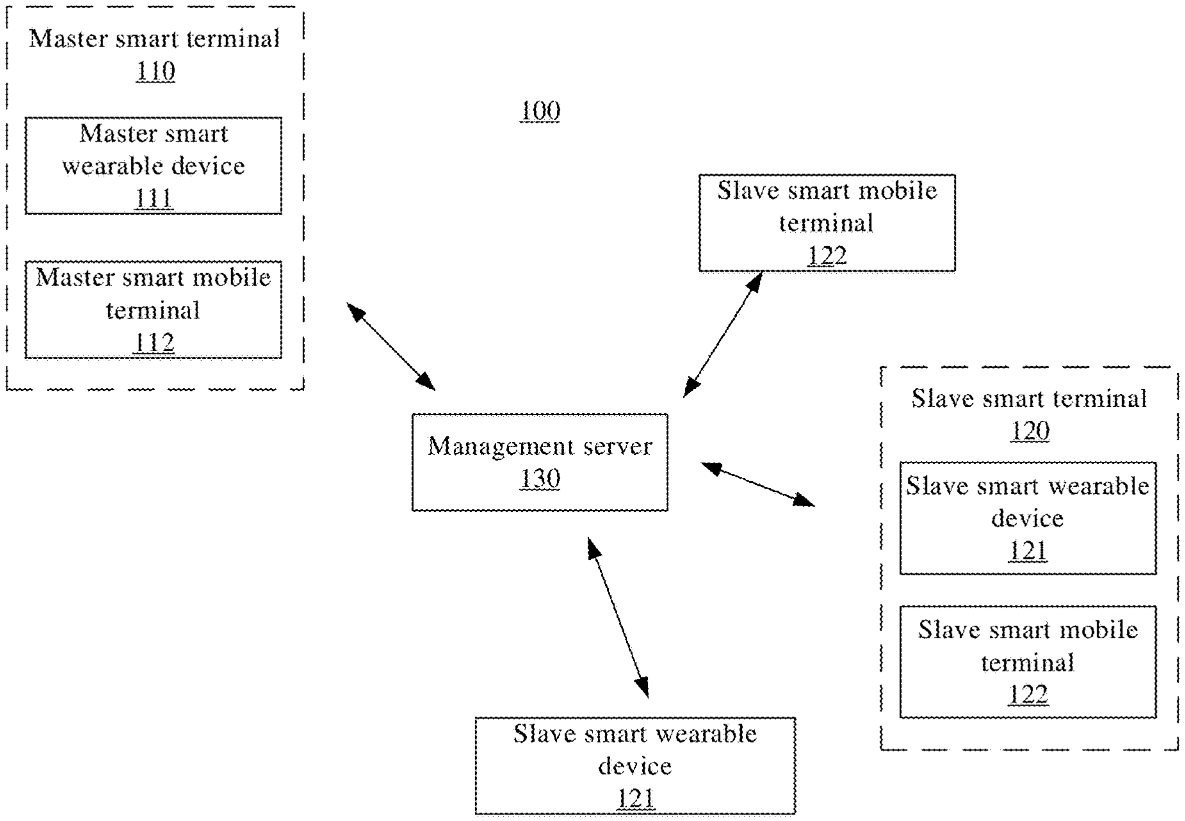
FIG. 2 is a schematic structural diagram of a multi-user cross-language interactive system based on LLMs according to another embodiment of the present disclosure.

Optionally, as shown in FIG. 2, in other embodiments of the present disclosure, the master smart terminal 120 includes: the master smart wearable device 111 and the master smart mobile terminal 112, the system 100 further includes a management server 130, and the first to be translated data includes a text or a speech from the first user.

The master smart wearable device 111 is used for: obtaining the first to be translated data, and transmitting the first to be translated data to the master smart mobile terminal 112.

The master smart mobile terminal 112 is used for transmitting the first to be translated data to the management server 130.

The management server 130 is used for: generating the first translation prompt, converting the speech in the first to be translated data into a first to be translated text by using a speech-to-text engine, wherein the speech-to-text engine is configured on the management server 130 or a speech-to-text server; translating, through the first LLM, the first to be translated text or the text in the first to be translated data into at least one first text data according to the first translation prompt, wherein the first LLM is configured on the management server 130 or a model server; converting, by using a text-to-speech engine, the at least one first text data into at least one first speech data, wherein the text-to-speech engine is configured on the management server 130 or a text-to-speech server; and distributing the at least one first text data and/or the at least one first speech data as the at least one first data to their respective corresponding slave smart terminal 120 for output.

Optionally, in other embodiments of the present disclosure, after the second data is output, the master smart wearable device 111 is further used for: obtaining third to be translated data, and transmitting the third to be translated data to the master smart mobile terminal 112. The third to be translated data includes a speech or a text from the first user.

The master smart mobile terminal 112 is further used for: based on a conversation mode, determining at least one first target language and determining at least one first target terminal from the plurality of slave smart terminals, and transmitting the third to be translated data and information of the at least one first target language and the at least one first target terminal to the management server 130.

The management server 130 is further used for: converting, by using the speech-to-text engine, the speech in the third to be translated data into a third to be translated text; generating a third translation prompt according to the information of the at least one first target language; translating, through the first LLM, the third to be translated text or the text in the third to be translated data into at least one third text data according to the third translation prompt; converting, by using the text-to-speech engine, the at least one third text data into at least one third speech data, and distributing the at least one third text data and/or the at least one third speech data to the at least one first target terminal according to the information of the at least one first target terminal.

It is understandable that: when the to be translated data is a text, the management server 130 may directly translate the text without performing the action of converting the speech to the text.

Optionally, in other embodiments of the present disclosure, the conversation mode includes: a private chat mode, a group mode and a sharing mode. The master smart mobile terminal 112 is further used for:

- when the conversation mode is the private chat mode, determining a language used by the second user as the first target language, and determining a slave smart terminal of the second user as the first target terminal;
- when the conversation mode is the group mode, determining at least one language corresponding to a group associated with the second user as the first target language, and determining slave smart terminals in the group as the first target terminal; and
- when the conversation mode is the sharing mode, determining languages of all the slave smart terminals as the first target language, and determining all the slave smart terminals as the first target terminal.

For example, the user 1 of the master smart terminal 110 uses Chinese, the user 2 of the slave smart terminal 120A uses English, the user 3 of the slave smart terminal 120B uses Japanese, and the user 4 of the slave smart terminal 120C uses English. The user 2 of the slave smart terminal 120A and the user 4 of the slave smart terminal 120C are members of the same group. After playing the translated speech of the user 2 from the slave smart terminal 120A, the master smart terminal 110 obtains the speech from the user 1 as the third to be translated data. When the current conversation mode is the private chat mode, the master smart terminal 110 translates the third to be translated data into the third speech data in English, and transmits the third speech data in English to the slave smart terminal 120A of the user 2. When the current conversation mode is the group mode, the master smart terminal 110 translates the third to be translated data into the third speech data in English, and transmits the third speech data in English to the slave smart terminal 120A of the user 2 and the slave smart terminal 120C of the user 4. When the current conversation mode is the sharing mode, the master smart terminal 110 translates the third to be translated data into the third speech data in English and the third speech data in Japanese respectively, transmits the third speech data in English to the slave smart terminal 120A of the user 2 and the slave smart terminal 120C of the user 4, and transmits the third speech data in Japanese to the slave smart terminal 120B of the user 3.

Optionally, the master smart terminal 110 and each slave smart terminal 120 may be installed with a mobile application (APP) or a virtual assistant program, the user can switch between different conversation modes through the user interface (UI) of the mobile APP, which is used for configuring the conversation mode. In other embodiments, the master smart terminal 110 or each slave smart terminal 120 may switch different conversation modes according to the user voice command obtained by the virtual assistant program.

Optionally, the user may select the form of the translated data through the mobile APP, such as translating a text into a speech, or translating the text into the text, or translating the speech into the text, or translating the speech into the speech, or translating the speech into the text and the speech.

Each smart terminal may report configuration information (such as the determined conversation mode, the selected form of the translated data, etc.) to the management server 130 for the subsequent translation by the management server 130, and the configuration information corresponds to the action(s) of the user on the mobile APP or the user voice command obtained through the virtual assistant program.

Optionally, as shown in FIG. 2, in other embodiments of the present disclosure, the slave smart terminal 120 includes: a slave smart wearable device 121 and a slave smart mobile terminal 122. The part of the slave smart mobile terminals 122 in the slave smart terminals 120 are associated with the slave smart wearable devices 121. The second to be translated data includes a text or a speech from the second user. The part of the slave smart mobile terminals 122 in the slave smart terminals 120 are associated with the slave smart wearable devices 121, that is, the slave smart mobile terminal 122 is not in one-to-one correspondence with the slave smart wearable device 121, some users may only use the smart mobile terminal 122 (at this time, the slave smart mobile terminal 122 may have the aforementioned functions of the slave smart wearable device 121), some users may use the slave smart wearable device 121 and the slave smart mobile terminal 122 at the same time. In other embodiments, some users may only use the slave smart wearable device 121, at this time, the functions of the slave smart mobile terminal 122 are implemented by the slave smart wearable device 121 or the management server 130.

The slave smart wearable device 121 is used for obtaining the second to be translated data, and transmitting the second to be translated data to an associated slave smart mobile terminal.

The slave smart mobile terminal 122 is used for transmitting the second to be translated data to the management server 130, where the second to be translated data is transmitted from the associated slave smart wearable device.

The management server 130 is further used for: converting, by using the speech-to-text engine, the speech in the second to be translated data into a second to be translated text; generating the second translation prompt; translating, through the second LLM, the second to be translated text or the text in the second to be translated data into second text data according to the second translation prompt, wherein the second LLM is configured on the management server 130 or the model server; converting, by using the text-to-speech engine, the second text data into second speech data; and transmitting the second text data and/or the second speech data as the second data to the master smart wearable device 111 for output, or transmitting the second text data and/or the second speech data as the second data to the master smart mobile terminal 112 so as to forward, through the master smart mobile terminal 112, the second data to the master smart wearable device 111 for output.

Optionally, in other embodiments of the present disclosure, the management server 130 is further used for: distributing the at least one first data to at least one corresponding slave smart wearable device and/or corresponding slave smart mobile terminal. The slave smart mobile terminal 122 is further used for: outputting the received first data, or transmitting the speech data in the received first data to the associated slave smart wearable device for output.

Furthermore, in other embodiments of the present disclosure, the management server 130 is further used for: determining, according to a preset language mapping table, at least one corresponding slave smart wearable device and/or corresponding slave smart mobile terminal, and at least one target slave smart wearable device and/or target slave smart mobile terminal. The language mapping table includes languages corresponding to the master smart terminal and each of the slave smart terminals. The language corresponding to the at least one corresponding slave smart wearable device and/or corresponding slave smart mobile terminal is different from the language corresponding to the master smart terminal, and the language corresponding to the at least one target slave smart wearable device and/or target slave smart mobile terminal is the same as the language corresponding to the master smart terminal.

The management server 130 is further used for: distributing the at least one first data to the at least one corresponding slave smart wearable device and/or corresponding slave smart mobile terminal, and distributing the first to be translated data to the at least one target slave smart wearable device and/or target slave smart mobile terminal.

The slave smart mobile terminal 120 is further used for: outputting the received translated data (such as, the first data or the third data) or the to be translated data (such as, the first to be translated data or the third to be translated data), or transmitting the speech data in the received translated data or the received to be translated data to an associated slave smart wearable device for playback.

The management server 130 is further used for: determining whether the language corresponding to the slave smart wearable device is the same as the language corresponding to the master smart wearable device according to the language mapping table; in response to the language corresponding to the slave smart wearable device being the same as the language corresponding to the master smart wearable device, transmitting the second to be translated data to the master smart wearable device for output, or transmitting the second to be translated data to the master smart mobile terminal, so as to forward, through the master smart mobile terminal, the second to be translated data to the master smart wearable device for output; and in response to the language corresponding to the slave smart wearable device not being the same as the language corresponding to the master smart wearable device, performing the aforementioned action of converting, by using the speech-to-text engine, the speech in the second to be translated data into the second to be translated text and the subsequent actions thereof.

Specifically, the language mapping table is preset in the management server 130, and the information stored in the language mapping table includes: identification information and corresponding languages of the master smart terminal and each of the slave smart terminals, and identity tags corresponding to each terminal (for example, the identity tag of the master smart terminal may be 1, and the identity tag of the slave smart terminal may be 0, which is only an example, and may not be limited to this in practical applications). The language corresponding to the master smart terminal is the language used by the master smart terminal, and the languages corresponding to each of the slave smart terminals are the languages used by each of the slave smart terminals. The identification information of the master smart terminal may be the device identification information of the master smart terminal, or the preset nickname of the user of the master smart terminal. The identification information of each of the slave smart terminals may be the device identification information of each of the slave smart terminals, or the preset nicknames of each of the slave smart terminals.

The master smart terminal and each of the slave smart terminals may be installed with a mobile application (APP) or a virtual assistant program. When the user sets the languages corresponding to the master smart terminal and each of the slave smart terminals through the APP or the virtual assistant program, the master smart terminal and each of the slave smart terminals transmit their respective identification information and the language(s) set by the user to the management server 130. In other embodiments, the master smart terminal and each of the slave smart terminals further may transmit their respective identification information and their respective preset corresponding languages to the management server 130 when joining a translation group (or a conversation group), so that the management server 130 sets the languages corresponding to the master smart terminal and each of the slave smart terminals in the language mapping table.

Further, the nicknames may be set by the user through the above-mentioned APP or the virtual assistant program, and may be reported to the management server 130.

Before performing the translating action using the LLM (s) each time (regardless of the conversation mode or operation mode), the management server 130 may determine whether the received to be translated data needs to be translated and which languages the received to be translated data needs to be translated into according to the language mapping table, and may select to transmit the to be translated data or the translated data to the corresponding terminal according to the determining result.

Optionally, in other embodiments of the present disclosure, the master smart terminal 120 includes: the master smart wearable device 111 or the master smart mobile terminal 112. The system 100 further includes a management server 130. The first to be translated data includes a text or a speech from the first user.

The master smart terminal 110 is used for: obtaining the first to be translated data, and transmitting the first to be translated data to the management server 130.

The management server 130 is used for: generating the first translation prompt, converting, by using a speech-to-text engine, the speech in the first to be translated data into a first to be translated text, wherein the speech-to-text engine is configured on the management server 130 or a speech-to-text server; translating, through the first LLM, the first to be translated text or the text in the first to be translated data into at least one first text data according to the first translation prompt, wherein the first LLM is configured on the management server 130 or a model server; converting, by using a text-to-speech engine, the at least one first text data into at least one first speech data, wherein the text-to-speech engine is configured on the management server 130 or a text-to-speech server; and distributing the at least one first text data and/or the at least one first speech data as the at least one first data to the at least one corresponding slave smart terminal for output.

Optionally, in other embodiments of the present disclosure, after the second data is output, the master smart terminal 110 is further used for: obtaining third to be translated data, wherein the third to be translated data includes a speech or a text from the first user; and determining at least one first target language and at least one first target terminal from the plurality of slave smart terminals 120 based on a conversation mode, and transmitting the third to be translated data and information of the at least one first target language and the at least one first target terminal to the management server 130.

The management server 130 is further used for: converting, by using the speech-to-text engine, the speech in the third to be translated data into a third to be translated text; generating a third translation prompt according to the information of the at least one first target language; translating, through the first LLM, the third to be translated text or the text in the third to be translated data into at least one third text data according to the third translation prompt; and converting, by using the text-to-speech engine, the at least one third text data into at least one third speech data, and distributing the at least one third text data and/or the at least one third speech data to the at least one first target terminal according to the information of the at least one first target terminal.

Optionally, in other embodiments of the present disclosure, each slave smart terminal 120 includes: a slave smart wearable device 121 or a slave smart mobile terminal 122. Part terminals in the slave smart mobile terminals 122 are associated with the slave smart wearable devices 121. The second to be translated data includes a text or a speech from the second user.

The slave smart terminal 120 is used for: obtaining the second to be translated data, and transmitting the second to be translated data to the management server 130.

The management server 130 is further used for: converting, by using the speech-to-text engine, the speech in the second to be translated data into a second to be translated text; generating the second translation prompt; translating, through the second LLM, the second to be translated text or the text in the second to be translated data into the second text data according to the second translation prompt, wherein the second LLM is configured on the management server 130 or the model server; and converting, by using the text-to-speech engine, the second text data into the second speech data, and transmitting the second text data and/or the second speech data as the second data to the master smart terminal 110 for output.

Optionally, in other embodiments of the present disclosure, the system 100 further includes a management server 130, and the second LLM is configured on the management server 130.

The slave smart mobile terminal 122 is further used for: switching an operation mode to a conference mode in response to a first switching instruction; and in a conference mode, determining at least one second target language according to at least one second target terminal indicated by a selecting action of a user, and transmitting the second to be translated data and information of the at least one second target terminal and the at least one second target language to the management server 130.

The management server 130 is used for: generating the second translation prompt according to the information of the at least one second target language; translating, through the second LLM, the second to be translated data into at least one second data corresponding to the at least one second target language according to the second translation prompt; and distributing the at least one second data to the at least one second target terminal for output according to the information of the at least one second target terminal.

The slave smart mobile terminal 122 is further used for: switching the operation mode to a tour guide mode in response to a second switching instruction; and in the tour guide mode, transmitting the second to be translated data and the language information of the first user to the management server 130.

The management server 130 is further used for: generating the second translation prompt according to the language information of the first user; translating, through the second LLM, the second to be translated data into second data corresponding to the language used by the first user according to the second translation prompt; and transmitting the second data to the master smart terminal 110 for output.

Optionally, the user may select, through the mobile APP on the master smart terminal 110 or the slave smart terminal 120, to set the operation mode to the tour guide mode or the conference mode, and configure the identities of the master smart terminal 110 and each slave smart terminal 120 in each mode. Further, in the conference mode, the user may select, through the mobile APP, to translate the to be translated data to whom to listen to or view it.

Optionally, the main smart terminal 110 may further initiate a conversation, create a conversation group, and generate a sharing link for joining the conversation or a QR code containing the sharing link, according to the action(s) of the user performed on the UI of the mobile APP or the voice command(s) sent by the user through the virtual assistant program. In other embodiments, when the master smart terminal 110 is smart glasses, the user may further initiate the conversation by pressing a physical or virtual button on the smart glasses for initiating the conversation. The conversation may be either a conference based conversation or a tour guide based conversation. The user may select the type of the conference on the UI of the APP, or specify the type of the conference via the voice command(s), or select the type of the conference by pressing a select button on the smart glasses.

Further, the master smart terminal 110 may initiate the conference through a conference server, and at this time, the shared link or the QR code may be generated by the conference server.

The slave smart terminal 120 (such as, the smart glasses or smart phone as the slave) may join the conference by scanning the QR code or opening the shared link through a Web APP running on a browser.

Further, when the user of the main smart terminal 110 performs a preset action to initiate a conversation on the UI of the APP (e.g., clicking a button in the UI for initiating a conversation), a prompt message will be displayed on the UI to prompt the user to select a source language and/or target language(s) before the conversation. When the user makes the selecting, the selecting result of the user is saved for subsequent translating actions. When the user does not make the selecting, the language auto-detection is enabled. For example, when the user does not select the source language, the language of the user speech may be detected by the speech-to-text engine, and the detected language may be used as the source language. Further, when the user of the master smart terminal 110 does not select the target language, the master smart terminal 110 or the management server 130 may request information of the language used by the slave smart terminal 120 from the slave smart terminal 120 (the slave smart terminal 120 may reply, the source language preset by the user of the slave smart terminal 120 on the APP of the slave smart terminal 120, or the system language of the slave smart terminal 120, to the master smart terminal 110 or the management server 130), and use the language returned by the slave smart terminal 120 as the target language. Further, when the smart terminal 120 does not reply the information of the language used by the smart terminal 120, a preset default language, such as English, may be used as the target language.

Optionally, an APP or a virtual assistant program may be installed on the slave smart terminal 120 (such as, smart glasses or smart phones as the slave). The user of the master smart terminal 110 or the slave smart terminal 120 may speak a voice command similar to "I want to speak", by pressing a virtual button for speaking configured on the terminal (such as, a touch sensor-based virtual button on the temple of smart glasses) or the UI of the APP, or by the virtual assistant program, to trigger the master smart terminal 110 or the slave smart terminal 120 to start picking up a user speech. When the user releases the virtual button, or when the microphone is idle for more than a preset time, the action of picking up the user speech is stopped. In other embodiments, the master smart terminal 110 or the slave smart terminal 120 may detect the point in time at which the user starts speaking and stops speaking through the voice activity detection (VAD).

Preferably, in one embodiment, the master smart terminal 110 and each slave smart terminal 120 may synchronously perform the actions of picking up and translating of the to be translated speech of the user through multi-threading, thereby reducing the delay of the translating.

For incomplete details not fully explained about the multi-user cross-language interactive system based on LLMs in this embodiment, please refer to the relevant descriptions in the embodiments shown in FIG. 3 to FIG. 6 below, which will not be described again here.

In the embodiment, the multi-user cross-language interactive capabilities are realized by combining multiple smart terminals with LLMs. This LLM-based approach enhances the practicality, interactivity, and intelligence of the smart terminal ecosystem, thereby increasing user engagement and satisfaction with the product. By leveraging the advanced natural language processing capabilities of the LLMs, the multi-user cross-language interaction feature allows users to seamlessly communicate across language barriers, fostering more inclusive and collaborative experiences.

Figure 3:
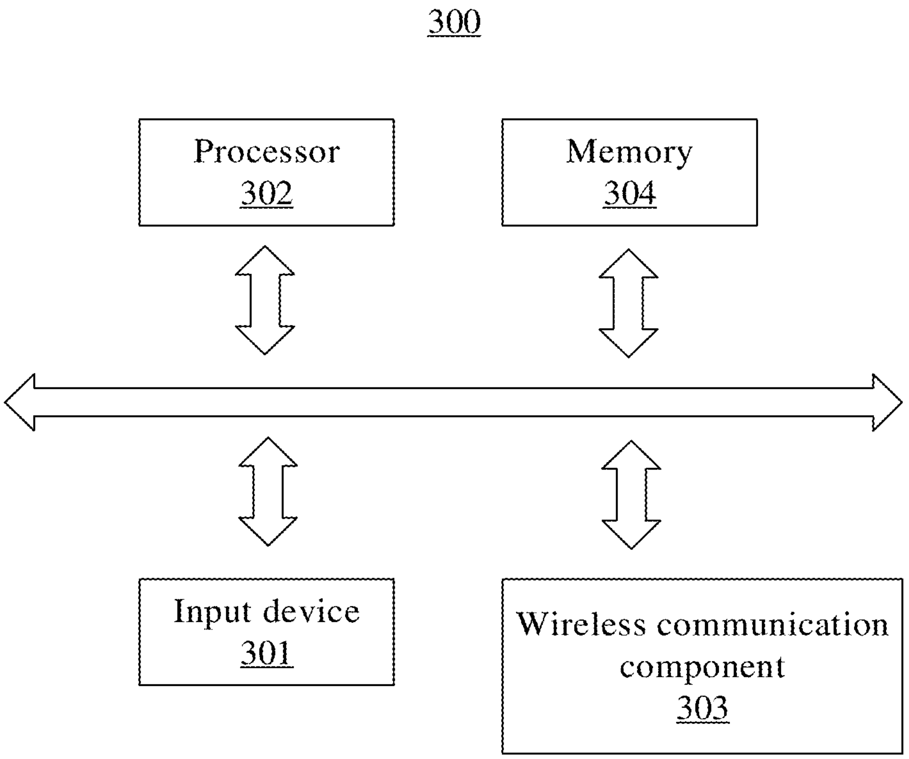
FIG. 3 is a schematic internal structural diagram of a smart terminal based on large language model (LLM) according to one embodiment of the present disclosure.

Referring to FIG. 3, a schematic internal structural diagram of a smart terminal based on large language model (LLM) according to one embodiment of the present disclosure. As shown in FIG. 3, the smart terminal 300 includes: an input device 301, a processor 302, a wireless communication component 303 and a memory 304. The processor 302 is electrically connected to the input device 301, the wireless communication component 303 and the memory 304.

One or more computer programs executable on the processor 302 are stored in the memory 304, and the one or more computer programs include a plurality of instructions, which are used for:

in response to a first configuration instruction, configuring the smart terminal 300 as a host;

when the smart terminal 300 acts as the host, obtaining, by the input device 301, first to be translated data, and transmitting, by the wireless communication component 303, the first to be translated data to a cloud server, so as to: translate, through the cloud server, the first to be translated data into at least one first data using a LLM on the cloud server according to a first translation prompt, and distribute the at least one first data to at least one slave smart terminal, wherein the first to be translated data includes a first to be translated text or a first to be translated speech from a user of the smart terminal 300 as the host, and the language of the at least one first data corresponds to the language used by the at least one slave smart terminal;

in response to a second configuration instruction, configuring the smart terminal 300 as a slave;

when the smart terminal 300 acts as the slave, obtaining, by the input device 301, second to be translated data, and transmitting the second to be translated data to the cloud server, so as to: translate, through the cloud server, the second to be translated data into second data using the LLM according to a second translation prompt, and transmit the second data to the master smart terminal, wherein the second to be translated data includes a second to be translated text or a second to be translated speech from the user of the smart terminal 300 as the slave, and the language of the second data corresponds to the language used by the master smart terminal.

Optionally, in other embodiments of the present disclosure, the smart terminal 300 is a smart mobile terminal or a smart wearable device.

Optionally, in other embodiments of the present disclosure, the instructions are further used for: determining whether all the slave smart terminals use the same language as the user of the smart terminal 300 as the host; in response to all the slave smart terminals using the same language as the user of the smart terminal 300 as the host, distributing the first to be translated data to each of the slave smart terminals for output; and in response to a language used by at least one terminal in the slave smart terminals being different from a language used by the user of the smart terminal 300 as the host, transmitting the first to be translated data to at least one first terminal in the slave smart terminals for output, and transmitting the first to be translated data and information of a language used by at least one second terminal in slave smart terminals to the cloud server, so as to: translate, through the cloud server, the first to be translated data into the at least one first data using the LLM according to the first translation prompt and the information of the language used by the at least one second terminal, and distribute the at least one first data to the at least one second terminal. The language of the at least one first data corresponds to the language used by the at least one second terminal, the language used by the at least one first terminal is the same as the language used by the user of the smart terminal 300 as the host, and the language used by the at least one second terminal is different from the language used by the user of the smart terminal 300 as the host.

Optionally, in other embodiments of the present disclosure, the instructions are further used for: determining whether the language used by the user of the smart terminal as the slave is the same as the language used by the master smart terminal; in response to the language used by the user of the smart terminal as the slave being the same as the language used by the master smart terminal, transmitting the second to be translated data to the master smart terminal for output; and in response to the language used by the user of the smart terminal as the slave not being the same as the language used by the master smart terminal, transmitting the second to be translated data to the cloud server so as to: translate, through the cloud server, the second to be translated data into second data using the LLM according to a second translation prompt, and transmit the second data to the master smart terminal.

Optionally, in other embodiments of the present disclosure, the smart terminal 300 is configured with an application program, and the instructions are further used for: in response to an initiating instruction, creating, by the application program, a conference through a conference server, and configuring the smart terminal 300 as the host; and joining, through the conference server, a terminal as a slave smart terminal to the conference in response to a first access request, where the first access request is sent by the terminal.

The instructions are further used for: after configuring the smart terminal 300 as the slave, sending a second access request to the conference server according to a preset shared link or a shared link obtained by scanning a QR code, to join the conference initiated by the master smart terminal.

Preferably, the smart terminal 300 is a smart wearable device.

Figure 4:
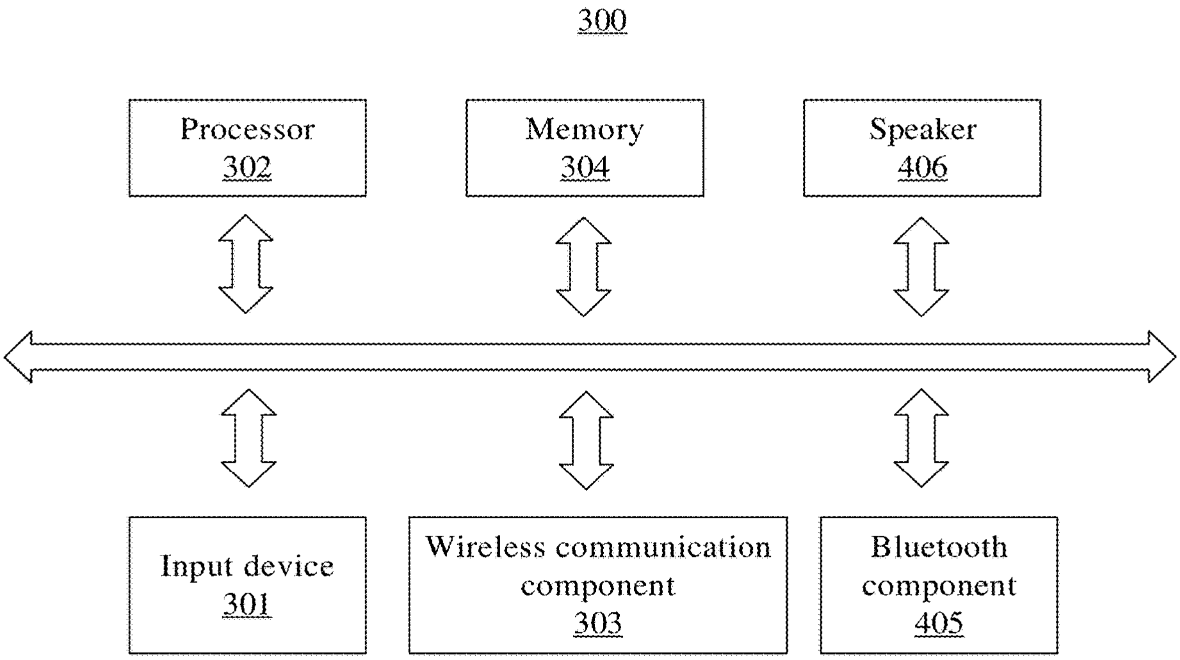
FIG. 4 is a schematic internal structural diagram of a smart terminal based on LLM according to another embodiment of the present disclosure.

Optionally, as shown in FIG. 4, in other embodiments of the present disclosure, the smart terminal 300 further includes a Bluetooth component 405 electrically connected to the processor 302, and the instructions are further used for: transmitting, through the Bluetooth component 405, the first to be translated data to a smart mobile terminal so as to transmit, through the smart mobile terminal, the first to be translated data to the cloud server; and transmitting, through the Bluetooth component 405, the second to be translated data to the smart mobile terminal so as to transmit, through the smart mobile terminal, the second to be translated data to the cloud server.

Optionally, as shown in FIG. 4, in other embodiments of the present disclosure, the smart terminal 300 further includes speaker(s) 406 electrically connected to the processor 302, and the instructions are further used for:

after configuring the smart terminal 300 as the host, receiving a speech transmitted by the cloud server and playing the speech through the speaker(s) 406;

obtaining, by the input device 301, third to be translated data, and determining at least one first target language and determining at least one first target terminal from a plurality of associated slave smart terminals based on a conversation mode, wherein the third to be translated data includes a third to be translated speech or a third to be translated text from the user of the smart terminal 300 as the host; and transmitting, through the wireless communication component 303, the third to be translated data and information of the at least one first target language and the at least one first target terminal to the cloud server, so that the cloud server translate the third to be translated data into at least one third data using the LLM and distribute the at least one third data to the at least one first target terminal for output, according to a third translation prompt and the information of the at least one first target language and the at least one first target terminal.

Optionally, in other embodiments of the present disclosure, the instructions are further used for:

after configuring the smart terminal 300 as the slave, switching an operation mode to a conference mode in response to a first switching instruction; and in the conference mode, determining at least one second target language according to at least one second target terminal indicated by a selecting action of the user of the smart terminal 300 as the slave, and transmitting the second to be translated data and information of the at least one second target terminal and the at least one second target language to the cloud server, so that the cloud server, according to the second translation prompt and the information of the at least one second target terminal and the at least one second target language, translate, through the LLM, the second to be translated data into at least one second data corresponding to the at least one second target language, and distribute the at least one second data to the at least one second target terminal for output; and switching the operation mode to a tour guide mode in response to a second switching instruction, and in the tour guide mode, transmitting the second to be translated data and language information of the master smart terminal to the cloud server, so that the cloud server, according to the second translation prompt and the language information of the master smart terminal, translate, through the LLM, the second to be translated data into the second data corresponding to a language used by the master smart terminal, and transmit the second data to the master smart terminal for output.

For incomplete details not fully explained about the smart terminal based on LLM in this embodiment, please refer to the relevant descriptions in the embodiments shown in aforementioned FIG. 1 to FIG. 2 and the embodiments shown in FIG. 5 and FIG. 6 below, which will not be described again here.

In the embodiment, the multi-user cross-language interactive capabilities are realized by combining multiple smart terminals with LLM(s). This LLM-based approach enhances the practicality, interactivity, and intelligence of the smart terminal ecosystem, thereby increasing user engagement and satisfaction with the product. By leveraging the advanced natural language processing capabilities of the LLM(s), the multi-user cross-language interaction feature allows users to seamlessly communicate across language barriers, fostering more inclusive and collaborative experiences.

Figure 5:
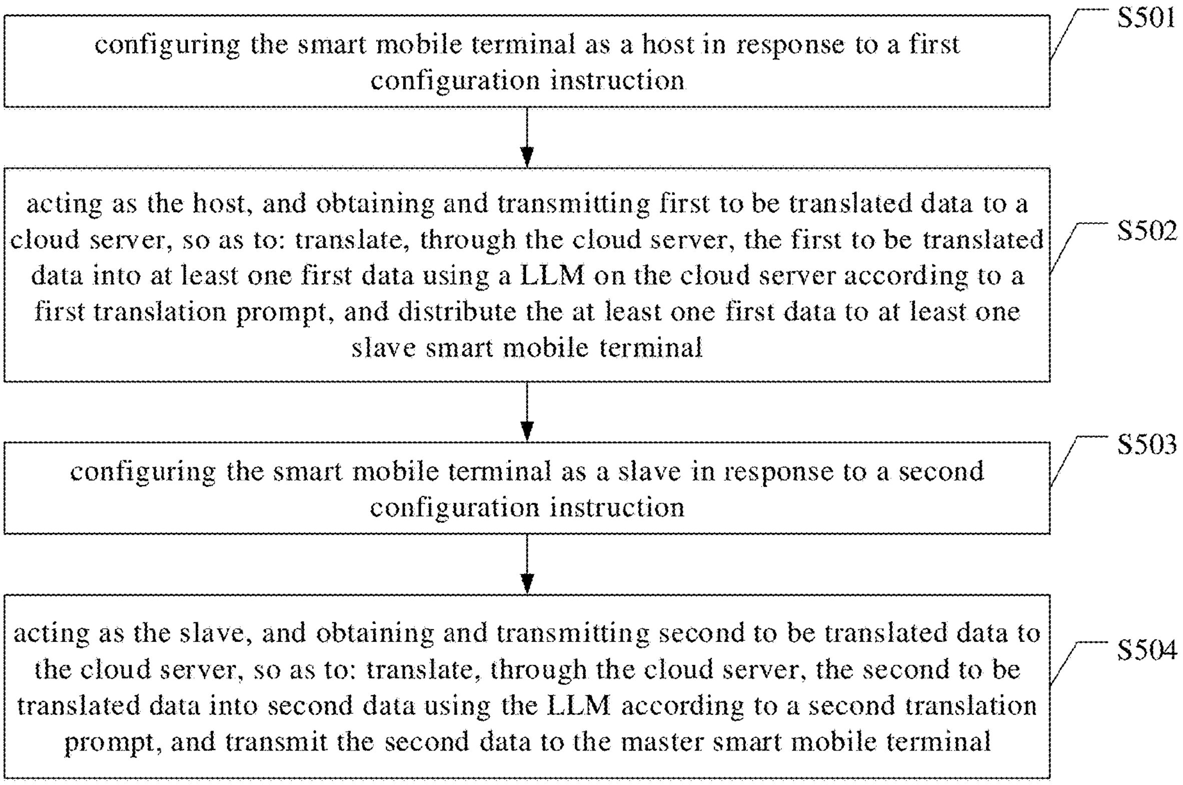
FIG. 5 is a flow diagram of a method for multi-user cross-language interaction based on large language model (LLM) according to one embodiment of the present disclosure.
Figure 6:
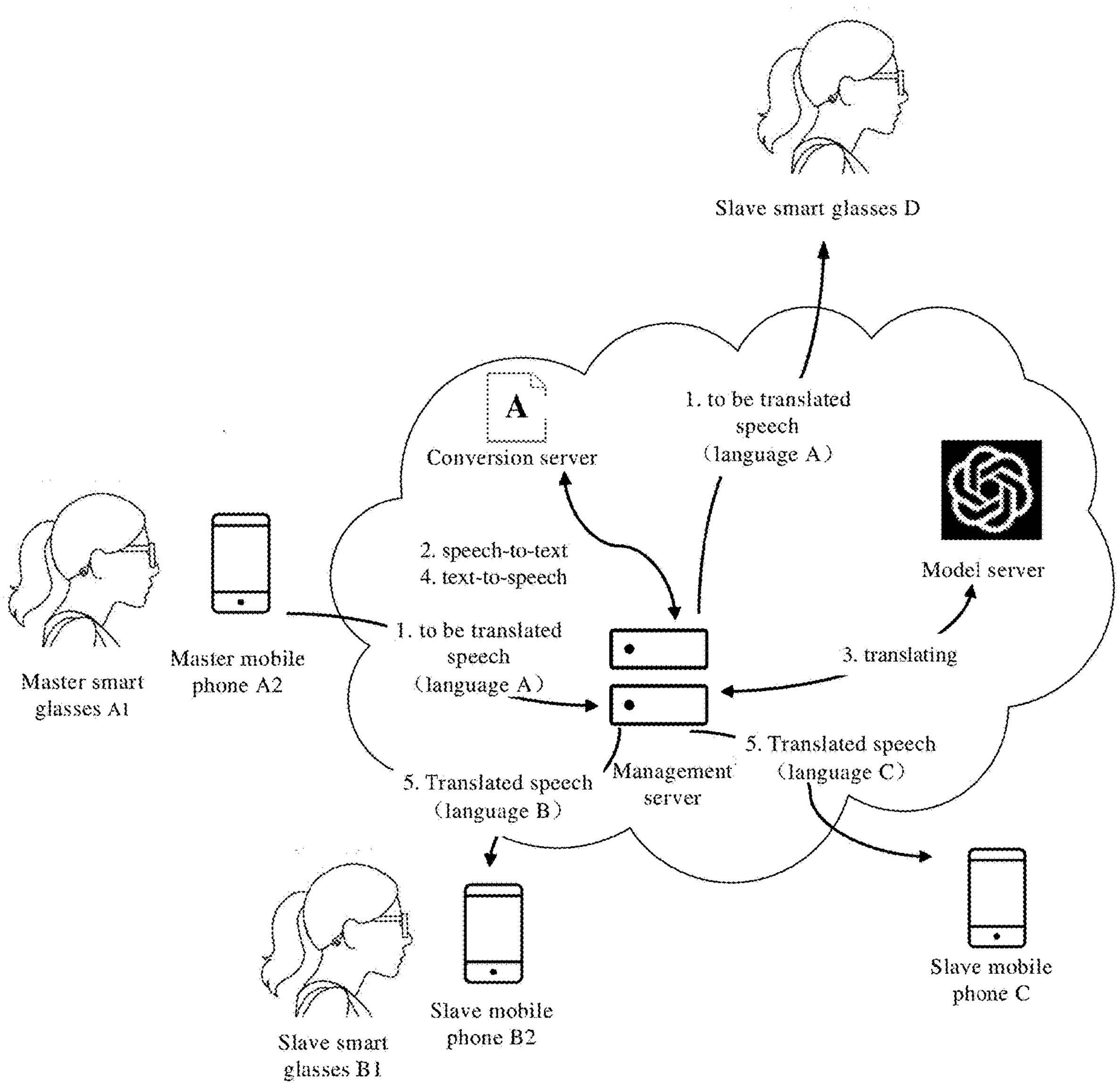
FIG. 6 is a schematic diagram of an application example of the method shown in FIG. 5.

Referring to FIG. 5, a flow diagram of a method for multi-user cross-language interaction based on large language model (LLM) according to one embodiment of the present disclosure. The method is applied to a smart mobile terminal, and the smart mobile terminal may include, but is not limited to: cellular phone, smart phone, other wireless communication device, personal digital assistant, audio player, other media player, music recorder, video recorder, camera, other media recorder, smart radio, Laptop computer, personal digital assistant (PDA), portable multimedia player (PMP), Moving Picture Experts Group (MPEG-1 or MPEG-2) audio layer 3 (MP3) player, digital camera, and other smart devices that can process data on the move. The smart mobile terminal is further installed with Android, IOS or other operating systems. As shown in FIG. 5, the method includes the following steps:

S501, configuring the smart mobile terminal as a host in response to a first configuration instruction;

S502, acting as the host, and obtaining and transmitting first to be translated data to a cloud server so as to: translate, through the cloud server, the first to be translated data into at least one first data using a LLM on the cloud server according to a first translation prompt, and distribute the at least one first data to at least one slave smart mobile terminal, wherein the first to be translated data includes a first to be translated text or a first to be translated speech from a user of the smart mobile terminal as the host, and a language of the at least one first data corresponds to a language used by the at least one slave smart mobile terminal;

S503, configuring the smart mobile terminal as a slave in response to a second configuration instruction; and S504, acting as the slave, and obtaining and transmitting second to be translated data to the cloud server so as to: translate, through the cloud server, the second to be translated data into second data using the LLM according to a second translation prompt, and transmit the second data to the master smart mobile terminal, wherein the second to be translated data includes a second to be translated text or a second to be translated speech from the user of the smart mobile terminal as the slave, and the language of the second data corresponds to the language used by the master smart mobile terminal.

Specifically, the smart mobile terminal may be installed with a mobile application (APP) or a virtual assistant program. The user may trigger the first configuration instruction or the second configuration instruction by action(s) on a user interface (UI) of the mobile APP or the virtual assistant program (for example, clicking a preset virtual button in the UI, which is preset for configuring the smart mobile terminal as the master or the slave), or the user may speak the first configuration instruction or the second configuration instruction by voice.

The smart mobile terminal is further configured with a language mapping table, and the information stored in the language mapping table includes: identification information and corresponding language of the smart mobile terminal as the host, identification information and corresponding languages of each of the slave smart mobile terminals as the slave, and identity tags corresponding to each terminal (for example, the identity tag of the host may be 1, and the identity tag of the slave may be 0, which is only an example, and may not be limited to this in practical applications).

Optionally, in other embodiments of the present disclosure, when the smart mobile terminal acts as the host, the smart mobile terminal may initiate a conversation and create a conversation group in response to an initiating instruction, join the sender of an access request to the conversation group as the slave in response to the access request, generate the language mapping table, and synchronize the language mapping table to all terminals in the conversation group. Further, the smart mobile terminal may synchronize the language mapping table to the cloud server. The conversation may be either a conference based conversation or a tour guide based conversation. The initiating instruction may be triggered by the user through a virtual button for initiating a conversation on the UI of the mobile APP or virtual assistant program, or may be spoken by the user through voice.

Further, the smart mobile terminal may scan the QR code to obtain the shared link in the QR code, and send the access request according to the shared link. The QR code may be generated by the host initiating the conversation.

Further, the user may set the language corresponding to the host and/or each slave through a language configuration menu on the UI of the mobile APP or virtual assistant program.

Further, the languages corresponding to each slave may be reported to the host by each slave after access, and may be recorded in the language mapping table by the host.

Further, the first configuration instruction may be automatically triggered when the smart mobile terminal initiates a conversation, and the second configuration instruction may be automatically triggered when the smart mobile terminal sends the access request.

Further, the host may be used as a hot spot, and each slave may be connected to the host. In other embodiments, the host and each slave may be located in the same WIFI network. In other embodiments, the host and some slaves are located in the same WIFI network, and the rest of the slaves join the conversation group through the cellular network, that is, the rest of the slaves have the remote conversation with the host. In other embodiments, the host and each slave respectively join the conversation group through the cellular network.

For the specific process of the cloud server using the LLM(s) on the cloud server to perform translating according to the translation prompt, please refer to the relevant contents in the embodiments shown in FIG. 1 to FIG. 4, which will not be described again here.

Optionally, in other embodiments of the present disclosure, after configuring the smart mobile terminal as the host, the method further includes:

- receiving and playing a speech transmitted by the cloud server;
- obtaining third to be translated data, and determining at least one first target language and determining at least one first target terminal from a plurality of associated slave smart terminals, based on a conversation mode, wherein the third to be translated data includes a third to be translated text or a third to be translated speech from the user of the smart mobile terminal as the host; and
- transmitting the third to be translated data and information of the at least one first target language and the at least one first target terminal to the cloud server, so as to: translate, through the cloud server, the third to be translated data into at least one third data using the LLM and distribute the at least one third data to the at least one first target terminal for output, according to a third translation prompt and the information of the at least one first target language and the at least one first target terminal.

Specifically, when the smart mobile terminal acts as the host, the smart mobile terminal further receives and plays the speech transmitted by the cloud server. The original voice of the speech comes from a user of a slave smart mobile terminal, and the cloud server translates the original voice and transmits the translated speech to the smart mobile terminal.

Optionally, the conversation mode includes: a private chat mode, a group mode and a sharing mode. After obtaining the third to be translated data, when the conversation mode is the private chat mode, the smart mobile terminal determines the language used by the target user corresponding to the played speech as the first target language, and determines a slave smart mobile terminal of the target user as the first target terminal; when the conversation mode is the group mode, the smart mobile terminal determines at least one language corresponding to a group associated with the target user as the first target language, and determines the slave smart mobile terminals in the group as the first target terminal; and when the conversation mode is the sharing mode, the smart mobile terminal determines the languages of all the slave smart mobile terminals as the first target language, and determines all the slave smart mobile terminals as the first target terminal.

Optionally, in other embodiments of the present disclosure, the step of obtaining and transmitting the second to be translated data to the cloud server includes:

in the conference mode, determining at least one second target language according to at least one second target terminal indicated by the selecting action(s) of the user of the smart mobile terminal as the slave, and transmitting the second to be translated data and information of the at least one second target terminal and the at least one second target language to the cloud server, so that the cloud server translates, through the LLM, the second to be translated data into at least one second data corresponding to the at least one second target language and distributes the at least one second data to the at least one second target terminal for output, according to the second translation prompt and the information of the at least one second target terminal and the at least one second target language; and in the tour guide mode, transmitting the second to be translated data and the language information of the master smart mobile terminal to the cloud server, so that the cloud server translates, through the LLM, the second to be translated data into the second data corresponding to the language used by the master smart mobile terminal according to the second translation prompt and the language information of the master smart mobile terminal, and transmits the second data corresponding to the language used by the master smart mobile terminal to the master smart mobile terminal for output.

Optionally, in other embodiments of the present disclosure, after configuring the smart mobile terminal as the host in response to the first configuration instruction, the method further includes: determining whether all the slave smart mobile terminals use the same language as the user of the smart mobile terminal as the host.

The step of transmitting the first to be translated data to the cloud server, includes: in response to all the slave smart mobile terminals using the same language as the user of the smart mobile terminal as the host, transmitting the first to be translated data to the cloud server, and instructing the cloud server to distribute the first to be translated data to each of the slave smart mobile terminals for output; and in response to the language used by at least one terminal in the slave smart mobile terminals being different from the language used by the user of the smart mobile terminal as the host, transmitting the first to be translated data to the cloud server, and instructing the cloud server to: transmit the first to be translated data to at least one first terminal in the slave smart mobile terminals for output, and translate, through the LLM, the first to be translated data into the at least one first data according to the first translation prompt and distribute the at least one first data to corresponding at least one second terminal in the slave smart mobile terminals simultaneously. The language of the at least one first data corresponds to the language used by the at least one second terminal, the language used by the at least one first terminal is the same as the language used by the user of the smart mobile terminal as the host, and the language used by the at least one second terminal is different from the language used by the user of the master smart terminal as the host.

Optionally, in other embodiments of the present disclosure, after configuring the smart mobile terminal as the slave in response to the second configuration instruction, the method further includes: determining whether the language used by the user of the smart mobile terminal as the slave is the same as the language used by the master smart mobile terminal.

The step of transmitting the second to be translated data to the cloud server includes: in response to the language used by the user of the smart mobile terminal as the slave being the same as the language used by the master smart mobile terminal, transmitting the second to be translated data to the cloud server, and instructing the cloud server to transmit the second to be translated data to the master smart mobile terminal for output; and in response to the language used by the user of the smart mobile terminal as the slave not being the same as the language used by the master smart mobile terminal, transmitting the second to be translated data to the cloud server, and instructing the cloud server to translate, through the LLM, the second to be translated data into the second data according to the second translation prompt, and transmit the second data to the master smart mobile terminal.

The aforementioned method will be described below with reference to FIG. 6. As shown in FIG. 6, in a practical example, a tour guide initiates, through the APP on the master mobile phone A2, a tour guide based conversation, creates a tour guide conversation group, and generates a corresponding language mapping table according to identity identification information of smart terminals joining the conversation. The tour guide conversation group includes: master smart glasses A1 and a master mobile phone A2 used by the tour guide, slave smart glasses B1 and a slave mobile phone B2 used by the tourist X, a slave mobile phone C used by the tourist Y, and slave smart glasses D used by the tourist Z. While initiating the conversation, under the guidance of the language setting prompt on the APP, the tour guide sets the language used by himself (such as language A), the language used by the tourist X (such as language B), the language used by the tourist Y (such as language C) and the language used by the tourist Z (such as language A), respectively.

When the tour guide speaks, the master smart glasses A1 obtains the speech of the tour guide and transmits the obtained speech as the to be translated speech to the master mobile phone A2 via Bluetooth, and then the master mobile phone A2 transmits the information of the languages of the tour guide, the tourist X, the tourist Y and the tourist Z set by the tour guide, the identity information of the slave mobile phone B2, the slave mobile phone C and the slave smart glasses D, and the speech to-be-translated to the management server.

In other embodiments, while the tour guide setting the language, the master mobile phone A2 may mark the corresponding languages in the language mapping table, and synchronize the language mapping table to the management server so that the management server uses it for the subsequent translation.

The management server compares the language used by the tour guide with the languages used by the tourists X, Y, and Z, and generates a translation prompt according to the comparing result. The translation prompt includes: information of the source language (language A) and the target language (language B and language C), and instruction information for instructing translation. At the same time, since the tourist Z uses the same language as the tour guide, the management server directly transmits the to be translated speech to the slave smart glasses D for playback according to the identity identification information of the slave smart glasses D.

Further, the management server converts the to be translated speech into a text in language A through a speech-to-text engine on the conversion server, and then transmits the text in language A and the translation prompt to the model server.

The model server translates the text in language A into a text in language B and a text in language C through the LLM(s) according to the translation prompt, and transmits the text in language B and the text in language C to the management server.

The management server converts the text in B language and the text in C language into corresponding speeches (that is, the translated speech in language B and the translated speech in language C) through a text-to-speech engine on the conversion server. Then, according to the identification information of the slave mobile phone B2 and the identification information of the slave mobile phone C, the management server transmits the translated speech in language B to the slave mobile phone B2, and transmits the translated speech in language C to the slave mobile phone C for playback. The slave mobile phone B2 transmits the received translated speech in language B to the slave smart glasses B1 via Bluetooth for playback.

Optionally, while transmitting the translated speech, the management server may transmit the text in language B to the slave mobile phone B2 so as to display the text in language B through the screen of the slave mobile phone B2, and transmit the text in language C to the slave mobile phone C so as to display the text in language C through the screen of the slave mobile phone C.

It is understandable that there are many combinations of the mobile phone or smart glasses as the master and slave to apply different scenarios. Take the tour guide as an example, in scenario 1, the tour guide and the tourists may all use the mobile phones; or in scenario 2, the tour guide and the tourists may all use the smart glasses; or in scenario 3, the tour guide and the tourists may all use the mobile phones and the smart glasses at the same time; or in scenario 4, the tour guide may use the mobile phone or the smart glasses, while the tourists may all use the mobile phones and the smart glasses at the same time; or in scenario 5, the tour guide may use the mobile phone or the smart glasses, some tourists may use the mobile phones, some tourists may use the smart glasses, and some tourists may use the mobile phones and the smart glasses at the same time; or in scenario 6, the tour guide may use the mobile phone and the smart glasses at the same time, some tourists may use the mobile phones, and some tourists may use the smart glasses.

Further, in the aforementioned scenarios, even in the same scenario, the to be translated data by each party may include only text, or only speech, or any combination of text and speech. For example, the to be translated data from the master is text, and the to be translated data from the slave(s) is speech. For example, the to be translated data by either or both of the master and slave(s) may be the speech at the current time, and further may be the text at the next moment, thereby meeting the needs of different translation occasions, for example, some words are inconvenient to say in public.

Further, during speech playback, the image of the speaker corresponding to the currently played speech may be displayed on the screen of the mobile phone simultaneously.

For incomplete details not fully explained about the method for multi-user cross-language interaction based on LLM in this embodiment, please refer to the relevant descriptions in the embodiments shown in FIG. 1 to FIG. 4, which will not be described again here.

In the embodiment, the multi-user cross-language interactive capabilities are realized by combining multiple smart terminals with LLM(s). This LLM-based approach enhances the practicality, interactivity, and intelligence of the smart terminal ecosystem, thereby increasing user engagement and satisfaction with the product. By leveraging the advanced natural language processing capabilities of the LLM(s), the multi-user cross-language interaction feature allows users to seamlessly communicate across language barriers, fostering more inclusive and collaborative experiences.

One embodiment of the present application further provides a non-transitory computer readable storage medium, which may be configured on the smart glasses or smart wearable device provided in the aforementioned embodiments, and may be the memory 304 in the embodiments shown in FIG. 3 or FIG. 4. The computer-readable storage medium stores computer program(s), and when the computer program(s) are executed by the processor, the method for multi-user cross-language interaction based on LLM described in the aforementioned embodiments is implemented. Furthermore, the computer-readable storage medium may be various media capable storing program codes, such as a USB flash disk, a removable hard disk, a read-only memory (ROM), a RAM, a magnetic disk, or an optical disk.

It should be understood that in the above-described embodiments of the present disclosure, the above-mentioned system, method and smart terminal for multi-user cross-language interaction based on large language models may be implemented in other manners. For example, multiple units/modules may be combined or be integrated into another system, or some of the features may be ignored or not performed. In addition, the above-mentioned mutual coupling/connection may be direct coupling/connection or communication connection, and may also be indirect coupling/connection or communication connection through some interfaces/devices, and may also be electrical, mechanical or in other forms.

It should be noted that for the various method embodiments described above, for the sake of simplicity, they are described as a series of action combinations. However, those skilled in the art should understand that the present disclosure is not limited by the order of the described actions, as certain steps can be performed in a different order or simultaneously. Additionally, it should be understood that the embodiments described in this invention are preferred embodiments, and the actions and modules involved are not necessarily required for the present disclosure.

In the above-mentioned embodiments, the descriptions of each embodiment have different focuses. For portions not described in a particular embodiment, reference can be made to relevant descriptions in other embodiments.

The above is a description of the system, method and smart terminal for multi-user cross-language interaction based on large language models provided by the present disclosure. Those skilled in the art should understand that based on the embodiments of the present disclosure, there may be changes in specific implementation methods and application scope. Therefore, the content of this specification should not be construed as limiting the present disclosure.

What is claimed is:

1. A multi-user cross-language interactive system based on large language models (LLMs), comprising: a master smart terminal and a plurality of slave smart terminals, wherein, the master smart terminal is configured for: obtaining first to be translated data from a first user, translating the first to be translated data into at least one first data through a first LLM according to a first translation prompt, and distributing the at least one first data to at least one corresponding slave smart terminal for output, wherein a language of the at least one first data corresponds to a language used by the at least one corresponding slave smart terminal, and the first LLM is configured on the master smart terminal or a cloud server; and the slave smart terminal is configured for: obtaining second to be translated data from a second user, translating the second to be translated data into second data through a second LLM according to a second translation prompt, and transmitting the second data to the master smart terminal for output, wherein a language of the second data is a language used by the master smart terminal, and the second LLM is configured on the slave smart terminals or the cloud server;

wherein the master smart terminal comprises a master smart wearable device and/or a master smart mobile terminal; wherein the slave smart terminal comprises a slave smart wearable device and/or a slave smart mobile terminal; and wherein each of the first LLM and the second LLM comprises: a generative artificial intelligence large language model (GAILLM) and/or a multimodal large language model (MLLM);

wherein the master smart terminal comprises the master smart wearable device and the master smart mobile terminal, the multi-user cross-language interactive system further comprises a management server, and the first to be translated data comprises a text or a speech from the first user;

the master smart wearable device is configured for: obtaining the first to be translated data, and transmitting the first to be translated data to the master smart mobile terminal;

the master smart mobile terminal is configured for: transmitting the first to be translated data to the management server; and the management server is configured for:

generating the first translation prompt;

converting, by using a speech-to-text engine, the speech in the first to be translated data into a first to be translated text, wherein the speech-to-text engine is configured on the management server or a speech-to-text server;

translating, through the first LLM, the first to be translated text or the text in the first to be translated data into at least one first text data according to the first translation prompt, wherein the first LLM is configured on the management server or a model server;

converting, by using a text-to-speech engine, the at least one first text data into at least one first speech data, wherein the text-to-speech engine is configured on the management server or a text-to-speech server; and distributing the at least one first text data and/or the at least one first speech data as the at least one first data to the at least one corresponding slave smart terminal for output, wherein, after the second data is output, the master smart wearable device is further configured for: obtaining a third to be translated data, and transmitting the third to be translated data to the master smart mobile terminal, wherein the third to be translated data comprises a speech or a text from the first user;

the master smart mobile terminal is further configured for: determining at least one first target language and determining at least one first target terminal from the slave smart terminals based on a conversation mode, and transmitting the third to be translated data and information of the at least one first target language and the at least one first target terminal to the management server; and the management server is further configured for:

converting, by using the speech-to-text engine, the speech in the third to be translated data into a third to be translated text;

generating a third translation prompt according to the information of the at least one first target language;

translating, through the first LLM, the third to be translated text or the text in the third to be translated data into at least one third text data according to the third translation prompt; and converting, by using the text-to-speech engine, the at least one third text data into at least one third speech data, and distributing the at least one third text data and/or the at least one third speech data to the at least one first target terminal according to the information of the at least one first target terminal; and wherein the conversation mode comprises: a private chat mode, a group mode and a sharing mode, and the master smart mobile terminal is further configured for:

in response to the conversation mode being the private chat mode, determining the language used by the second user as the first target language, and determining a slave smart terminal of the second user as the first target terminal;

in response to the conversation mode being the group mode, determining at least one language corresponding to a group associated with the second user as the first target language, and determining slave smart terminals in the group as the first target terminal; and in response to the conversation mode being the sharing mode, determining languages of all the slave smart terminals as the first target language, and determining all the slave smart terminals as the first target terminal.

2. The multi-user cross-language interactive system of claim 1, wherein the master smart terminal is further configured for:

determining whether all the slave smart terminals use a same language as the first user;

in response to all the slave smart terminals using the same language as the first user, distributing the first to be translated data to each of the slave smart terminals for output; and in response to a language used by at least one terminal in the slave smart terminals being different from a language used by the first user, transmitting the first to be translated data to at least one first terminal in the slave smart terminals for output, translating the first to be translated data into the at least one first data through the first LLM according to the first translation prompt, and distributing the at least one first data to at least one second terminal in the slave smart terminals for output, wherein the language of the at least one first data corresponds to a language used by the at least one second terminal, and wherein a language used by the at least one first terminal is the same as the language used by the first user, and the language used by the at least one second terminal is different from the language used by the first user; and wherein the slave smart terminal is further configured for:

determining whether a language used by the second user is the same as the language used by the first user;

in response to the language used by the second user being the same as the language used by the first user, transmitting the second to be translated data to the master smart terminal for output; and in response to the language used by the second user not being the same as the language used by the first user, translating the second to be translated data into the second data through the second LLM according to the second translation prompt, and transmitting the second data to the master smart terminal for output.

3. The multi-user cross-language interactive system of claim 1, wherein the slave smart terminals comprise slave smart wearable devices and slave smart mobile terminals, a part of the slave smart mobile terminals is associated with the slave smart wearable devices, and the second to be translated data comprises a text or a speech from the second user;

the slave smart wearable device is configured for: obtaining the second to be translated data, and transmitting the second to be translated data to an associated slave smart mobile terminal;

the slave smart mobile terminal is configured for transmitting the second to be translated data to the management server;

the management server is further configured for:

converting, by using the speech-to-text engine, the speech in the second to be translated data into a second to be translated text;

generating the second translation prompt;

translating, through the second LLM, the second to be translated text or the text in the second to be translated data into second text data according to the second translation prompt, wherein the second LLM is configured on the management server or the model server;

converting, by using the text-to-speech engine, the second text data into second speech data; and transmitting the second text data and/or the second speech data as the second data to the master smart wearable device for output, or transmitting the second text data and/or the second speech data as the second data to the master smart mobile terminal so as to forward, through the master smart mobile terminal, the second text data and/or the second speech data to the master smart wearable device for output.

4. The multi-user cross-language interactive system of claim 3, wherein, the management server is further configured for: determining at least one corresponding slave smart wearable device and/or corresponding slave smart mobile terminal, and at least one target slave smart wearable device and/or target slave smart mobile terminal according to a preset language mapping table, wherein the language mapping table comprises languages corresponding to the master smart terminal and each of the slave smart terminals, a language corresponding to the at least one corresponding slave smart wearable device and/or corresponding slave smart mobile terminal is different from a language corresponding to the master smart terminal, and a language corresponding to the at least one target slave smart wearable device and/or target slave smart mobile terminal is the same as the language corresponding to the master smart terminal;

the management server is further configured for: distributing the at least one first data to the at least one corresponding slave smart wearable device and/or corresponding slave smart mobile terminal, and distributing the first to be translated data to the at least one target slave smart wearable device and/or target slave smart mobile terminal;

the slave smart mobile terminal is further configured for: outputting received translated data or to be translated data, or transmitting speech data in the received translated data or the to be translated data to an associated slave smart wearable device for playback; and the management server is configured for:

determining whether a language corresponding to the slave smart wearable device is the same as a language corresponding to the master smart wearable device according to the language mapping table;

in response to the language corresponding to the slave smart wearable device being the same as the language corresponding to the master smart wearable device, transmitting the second to be translated data to the master smart wearable device for output, or transmitting the second to be translated data to the master smart mobile terminal, so as to forward, through the master smart mobile terminal, the second to be translated data to the master smart wearable device for output; and in response to the language corresponding to the slave smart wearable device not being the same as the language corresponding to the master smart wearable device, converting, by using the speech-to-text engine, the speech in the second to be translated data into the second to be translated text.

5. The multi-user cross-language interactive system of claim 1, wherein the master smart terminal comprises the master smart wearable device or the master smart mobile terminal, the multi-user cross-language interactive system further comprises a management server, and the first to be translated data comprises a text or a speech from the first user;

the master smart terminal is configured for: obtaining the first to be translated data, and transmitting the first to be translated data to the management server;

the management server is configured for:

generating the first translation prompt;

converting, by using a speech-to-text engine, the speech in the first to be translated data into a first to be translated text, wherein the speech-to-text engine is configured on the management server or a speech-to-text server;

translating, through the first LLM, the first to be translated text or the text in the first to be translated data into at least one first text data according to the first translation prompt, wherein the first LLM is configured on the management server or a model server;

converting, by using a text-to-speech engine, the at least one first text data into at least one first speech data, wherein the text-to-speech engine is configured on the management server or a text-to-speech server; and distributing the at least one first text data and/or the at least one first speech data as the at least one first data to the at least one corresponding slave smart terminal for output.

6. The multi-user cross-language interactive system of claim 5, wherein, after the second data is output, the master smart terminal is further configured for:

obtaining third to be translated data, wherein the third to be translated data comprises a speech or a text from the first user; and determining at least one first target language and determining at least one first target terminal from the slave smart terminals based on a conversation mode, and transmitting the third to be translated data and information of the at least one first target language and the at least one first target terminal to the management server;

the management server is further configured for:

converting, by using the speech-to-text engine, the speech in the third to be translated data into a third to be translated text;

generating a third translation prompt according to the information of the at least one first target language;

translating, through the first LLM, the third to be translated text or the text in the third to be translated data into at least one third text data according to the third translation prompt; and converting, by using the text-to-speech engine, the at least one third text data into at least one third speech data, and distributing the at least one third text data and/or the at least one third speech data to the at least one first target terminal according to the information of the at least one first target terminal.

7. The multi-user cross-language interactive system of claim 5, wherein the slave smart terminals comprise the slave smart wearable devices or the slave smart mobile terminals, a part of the slave smart mobile terminals is associated with the slave smart wearable devices, and the second to be translated data comprises a text or a speech from the second user;

the slave smart terminal is configured for: obtaining the second to be translated data, and transmitting the second to be translated data to the management server; and the management server is further configured for:

converting, by using the speech-to-text engine, the speech in the second to be translated data into a second to be translated text;

generating the second translation prompt;

translating, through the second LLM, the second to be translated text or the text in the second to be translated data into second text data according to the second translation prompt, wherein the second LLM is configured on the management server or the model server; and converting, by using the text-to-speech engine, the second text data into second speech data, and transmitting the second text data and/or the second speech data as the second data to the master smart terminal for output.

8. The multi-user cross-language interactive system of claim 1, wherein the multi-user cross-language interactive system further comprises a management server, and the second LLM is configured on the management server, the slave smart mobile terminal is further configured for:

switching an operation mode to a conference mode in response to a first switching instruction; and in the conference mode, determining at least one second target language according to at least one second target terminal indicated by a selecting action of a user, and transmitting the second to be translated data and information of the at least one second target terminal and the at least one second target language to the management server;

the management server is configured for:

generating the second translation prompt according to the information of the at least one second target language; and translating, through the second LLM, the second to be translated data into at least one second data corresponding to the at least one second target language according to the second translation prompt, and distributing the at least one second data to the at least one second target terminal for output according to the information of the at least one second target terminal;

the slave smart mobile terminal is further configured for:

switching the operation mode to a tour guide mode in response to a second switching instruction; and in the tour guide mode, transmitting the second to be translated data and language information of the first user to the management server;

the management server is further configured for:

generating the second translation prompt according to the language information of the first user; and translating, through the second LLM, the second to be translated data into the second data corresponding to the language of the first user according to the second translation prompt, and transmitting the second data to the master smart terminal for output.

9. A smart terminal based on large language model (LLM), comprising: an input device, a processor, a wireless communication component and a memory, wherein the processor is electrically connected to the input device, the wireless communication component and the memory;

wherein one or more computer programs executable on the processor are stored in the memory, and the one or more computer programs comprise instructions for:

in response to a first configuration instruction, configuring the smart terminal as a host;

when the smart terminal acts as the host, obtaining, by the input device, first to be translated data, and transmitting, by the wireless communication component, the first to be translated data to a cloud server, so as to: through the cloud server, translate the first to be translated data into at least one first data using a LLM on the cloud server according to a first translation prompt, and distribute the at least one first data to at least one slave smart terminal, wherein the first to be translated data comprises a first to be translated text or a first to be translated speech from a user of the smart terminal as the host, and a language of the at least one first data corresponds to a language used by the at least one slave smart terminal;

in response to a second configuration instruction, configuring the smart terminal as a slave; and when the smart terminal acts as the slave, obtaining, by the input device, second to be translated data, and transmitting the second to be translated data to the cloud server, so as to: through the cloud server, translate the second to be translated data into second data using the LLM according to a second translation prompt, and transmit the second data to a master smart terminal, wherein the second to be translated data comprises a second to be translated text or a second to be translated speech from a user of the smart terminal as the slave, and a language of the second data corresponds to a language used by the master smart terminal;

wherein the smart terminal further comprises a speaker electrically connected to the processor, and after configuring the smart terminal as the host, the instructions are further configured for:

receiving a speech transmitted by the cloud server, and playing the speech through the speaker;

obtaining, by the input device, third to be translated data, and determining at least one first target language and determining at least one first target terminal from a plurality of associated slave smart terminals based on a conversation mode, wherein the third to be translated data comprises a third to be translated speech or a third to be translated text from the user of the smart terminal as the host; and transmitting, through the wireless communication component, the third to be translated data and information of the at least one first target language and the at least one first target terminal to the cloud server, so that the cloud server translates the third to be translated data into at least one third data using the LLM and distributes the at least one third data to the at least one first target terminal for output, according to a third translation prompt and the information of the at least one first target language and the at least one first target terminal; and wherein the conversation mode comprises: a private chat mode, a group mode and a sharing mode, and after configuring the smart terminal as the host, the instructions are further configured for:

in response to the conversation mode being the private chat mode, determining a language used by a chat partner as the first target language, and determining a slave smart terminal of the chat partner as the first target terminal;

in response to the conversation mode being the group mode, determining at least one language corresponding to a group associated with the chat partner as the first target language, and determining slave smart terminals in the group as the first target terminal; and in response to the conversation mode being the sharing mode, determining languages of all of the associated slave smart terminals as the first target language, and determining all of the associated slave smart terminals as the first target terminal.

10. The smart terminal of claim 9, wherein the smart terminal is a smart mobile terminal or a smart wearable device.

11. The smart terminal of claim 10, wherein, after configuring the smart terminal as the slave, the instructions are further configured for:

switching an operation mode to a conference mode in response to a first switching instruction;

in the conference mode, determining at least one second target language according to at least one second target terminal indicated by a selecting action of the user of the smart terminal as the slave, and transmitting the second to be translated data and information of the at least one second target terminal and the at least one second target language to the cloud server, so that the cloud server translates the second to be translated data into at least one second data corresponding to the at least one second target language using the LLM and distributes the at least one second data to the at least one second target terminal for output, according to the second translation prompt and the information of the at least one second target terminal and the at least one second target language;

switching the operation mode to a tour guide mode in response to a second switching instruction; and in the tour guide mode, transmitting the second to be translated data and language information of the master smart terminal to the cloud server, so that the cloud server translates the second to be translated data into the second data corresponding to the language used by the master smart terminal using the LLM and transmits the second data corresponding to the language used by the master smart terminal to the master smart terminal for output, according to the second translation prompt and the language information of the master smart terminal.

12. The smart terminal of claim 9, wherein the instructions are further configured for:

determining whether all slave smart terminals use a same language as the user of the smart terminal as the host;

in response to all the slave smart terminals using the same language as the user of the smart terminal as the host, distributing the first to be translated data to each of the slave smart terminals for output; and in response to a language used by at least one terminal in the slave smart terminals being different from a language used by the user of the smart terminal as the host, transmitting the first to be translated data to at least one first terminal in the slave smart terminals for output, and transmitting the first to be translated data and information of a language used by at least one second terminal in the slave smart terminals to the cloud server, so that the cloud server translates the first to be translated data into the at least one first data using the LLM according to the first translation prompt and the information of the language used by the at least one second terminal, and distributes the at least one first data to the at least one second terminal, wherein the language of the at least one first data corresponds to the language used by the at least one second terminal, a language used by the at least one first terminal uses is the same as the language used by the user of the smart terminal as the host, and the language used by the at least one second terminal is different from the language used by the user of the smart terminal as the host; and wherein the instructions are further configured for:

determining whether the language used by the user of the smart terminal as the slave is the same as the language used by the master smart terminal;

in response to the language used by the user of the smart terminal as the slave being the same as the language used by the master smart terminal, transmitting the second to be translated data to the master smart terminal for output; and in response to the language used by the user of the smart terminal as the slave not being the same as the language used by the master smart terminal, transmitting the second to be translated data to the cloud server.

13. The smart terminal of claim 9, wherein the smart terminal is configured with an application program, and the instructions are further configured for:

in response to an initiating instruction, creating, by the application program, a conference through a conference server, and configuring the smart terminal as the host; and joining, through the conference server, a terminal as a slave smart terminal to the conference in response to a first access request, wherein the first access request is sent by the terminal;

wherein, after configuring the smart terminal as the slave, the instructions are further configured for:

sending a second access request to the conference server to join a conference initiated by the master smart terminal according to a preset shared link or a shared link obtained by scanning a QR code.

14. The smart terminal of claim 13, wherein the smart terminal is the smart wearable device, the smart terminal further comprises a Bluetooth component electrically connected to the processor, and the instructions are further configured for:

transmitting, through the Bluetooth component, the first to be translated data to a smart mobile terminal, so as to transmit, through the smart mobile terminal, the first to be translated data to the cloud server; and transmitting, through the Bluetooth component, the second to be translated data to the smart mobile terminal, so as to transmit, through the smart mobile terminal, the second to be translated data to the cloud server.

15. A method for multi-user cross-language interaction based on large language model (LLM) applied to a smart mobile terminal, comprising:

configuring the smart mobile terminal as a host in response to a first configuration instruction;

obtaining and transmitting, by the smart mobile terminal as the host, first to be translated data to a cloud server, so as to: through the cloud server, translate the first to be translated data into at least one first data using a LLM on the cloud server according to a first translation prompt, and distribute the at least one first data to at least one slave smart mobile terminal, wherein the first to be translated data comprises a first to be translated text or a first to be translated speech from a user of the smart mobile terminal as the host, and a language of the at least one first data corresponds to a language used by the at least one slave smart mobile terminal;

configuring the smart mobile terminal as a slave in response to a second configuration instruction; and obtaining and transmitting, by the smart mobile terminal as the slave, second to be translated data to the cloud server, so as to: through the cloud server, the second to be translated data into second data using the LLM according to a second translation prompt, and transmit the second data to the master smart mobile terminal, wherein the second to be translated data comprises a second to be translated text or a second to be translated speech from a user of the smart mobile terminal as the slave, and a language of the second data corresponds to a language used by the master smart mobile terminal;

wherein, after configuring the smart mobile terminal as the host, the method further comprises:

receiving and playing a speech transmitted by the cloud server;

obtaining third to be translated data, and based on a conversation mode, determining at least one first target language and determining at least one first target terminal from a plurality of associated slave smart terminals, wherein the third to be translated data comprises a third to be translated text or a third to be translated speech from the user of the smart terminal as the host; and transmitting the third to be translated data and information of the at least one first target language and the at least one first target terminal to the cloud server, so that the cloud server translates the third to be translated data into at least one third data using the LLM and distributes the at least one third data to the at least one first target terminal for output, according to a third translation prompt and the information of the at least one first target language and the at least one first target terminal; and wherein the conversation mode comprises: a private chat mode, a group mode and a sharing mode, and the step of based on the conversation mode, determining the at least one first target language and determining the at least one first target terminal from the associated slave smart terminals comprises:

in response to the conversation mode being the private chat mode, determining a language used by a chat partner as the first target language, and determining a slave smart terminal of the chat partner as the first target terminal;

in response to the conversation mode being the group mode, determining at least one language corresponding to a group associated with the chat partner as the first target language, and determining slave smart terminals in the group as the first target terminal; and in response to the conversation mode being the sharing mode, determining languages of all of the associated slave smart terminals as the first target language, and determining all of the associated slave smart terminals as the first target terminal.

16. The method of claim 15, wherein the step of obtaining and transmitting the second to be translated data to the cloud server comprises:

in a conference mode, determining at least one second target language according to at least one second target terminal indicated by a selecting action of the user of the smart mobile terminal as the slave, and transmitting the second to be translated data and information of the at least one second target terminal and the at least one second target language to the cloud server, so that the cloud server, according to the second translation prompt and the information of the at least one second target terminal and the at least one second target language, translates, through the LLM, the second to be translated data into at least one second data corresponding to the at least one second target language, and distributes the at least one second data to the at least one second target terminal for output; and in a tour guide mode, transmitting the second to be translated data and language information of the master smart mobile terminal to the cloud server, so that the cloud server, according to the second translation prompt and the language information of the master smart mobile terminal, translates, through the LLM, the second to be translated data into the second data corresponding to the language used by the master smart mobile terminal, and transmitting the second data corresponding to the language used by the master smart mobile terminal to the master smart mobile terminal for output.

17. The method of claim 15, wherein, after configuring the smart mobile terminal as the host in response to the first configuration instruction, the method further comprises:

determining whether all slave smart mobile terminals use a same language as the user of the smart mobile terminal as the host; and the step of transmitting the first to be translated data to the cloud server comprises:

in response to all the slave smart mobile terminals using the same language as the user of the smart mobile terminal as the host, transmitting the first to be translated data to the cloud server, and instructing the cloud server to distribute the first to be translated data to each of the slave smart mobile terminals for output; and in response to a language used by at least one terminal in the slave smart mobile terminals being different from a language used by the user of the smart mobile terminal as the host, transmitting the first to be translated data to the cloud server, and instructing the cloud server to: transmit the first to be translated data to at least one first terminal in the slave smart mobile terminals for output, and translate, through the LLM, the first to be translated data into the at least one first data according to the first translation prompt and distribute the at least one first data to at least one second terminal in the slave smart mobile terminals simultaneously, wherein the language of the at least one first data corresponds to a language used by the at least one second terminal, a language used by the at least one first terminal is the same as the language used by the user of the smart mobile terminal as the host, and the language used by the at least one second terminal is different from the language used by the user of the smart mobile terminal as the host; and wherein after configuring the smart mobile terminal as the slave in response to the second configuration instruction, the method further comprises:

determining whether the language used by the user of the smart mobile terminal as the slave is the same as the language used by the master smart mobile terminal; and the step of transmitting the second to be translated data to the cloud server comprises:

in response to the language used by the user of the smart mobile terminal as the slave being the same as the language used by the master smart mobile terminal, transmitting the second to be translated data to the cloud server, and instructing the cloud server to transmit the second to be translated data to the master smart mobile terminal for output; and in response to the language used by the user of the smart mobile terminal as the slave not being the same as the language used by the master smart mobile terminal, transmitting the second to be translated data to the cloud server, and instructing the cloud server to: translate the second to be translated data into the second data using the LLM according to the second translation prompt, and transmit the second data to the master smart mobile terminal.

* * * * *